No. 814,479. PATENTED MAR. 6, 1906.
J. W. RODDY.
RESILIENT VEHICLE WHEEL.
APPLICATION FILED OCT. 21, 1905.
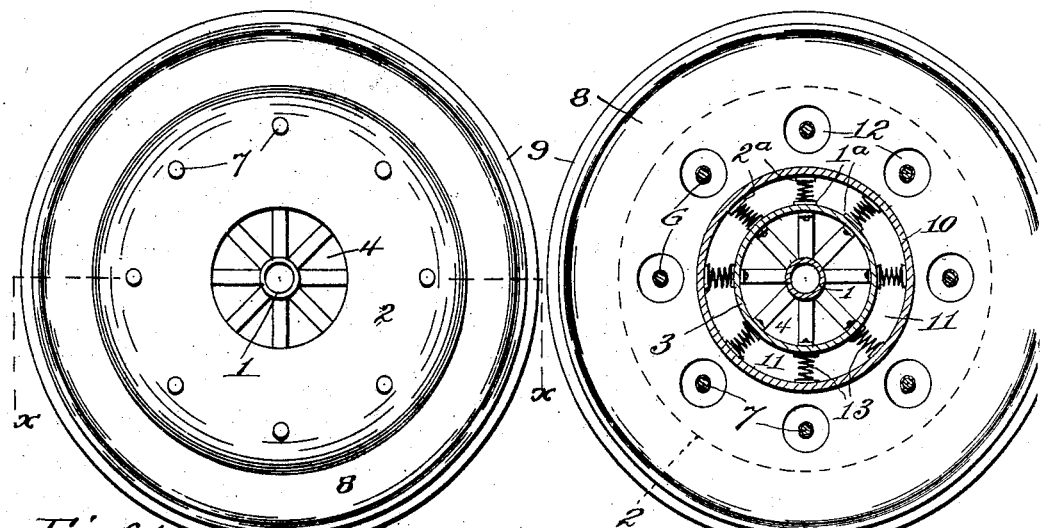
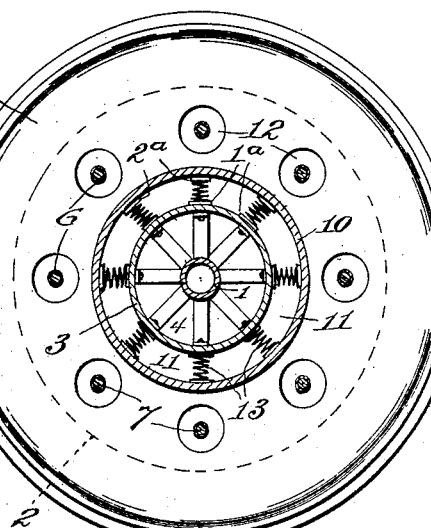
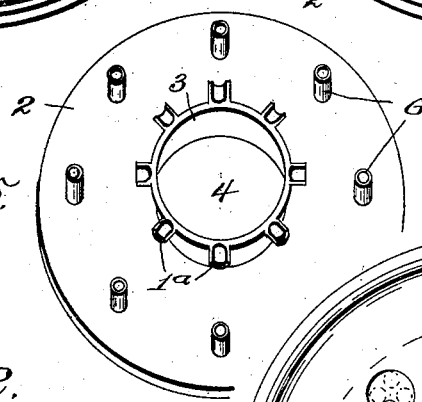
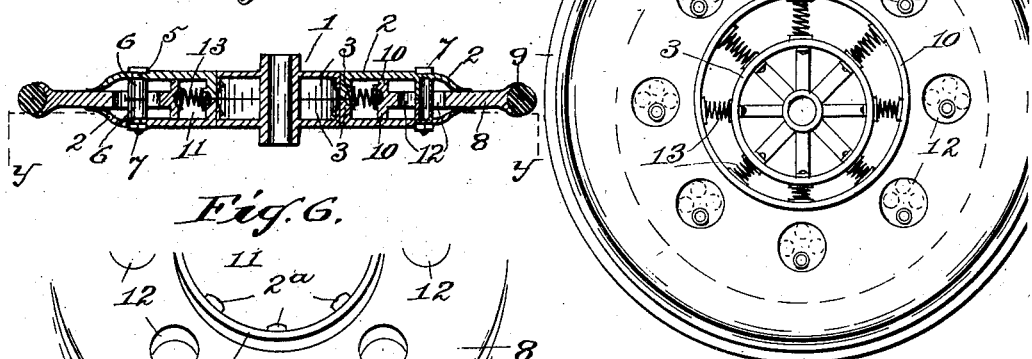
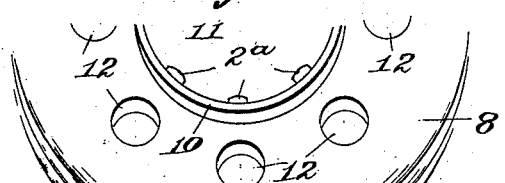
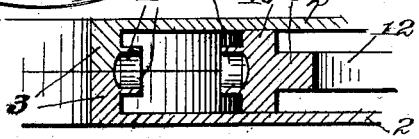
Witnesses:
L. E. Money.
W. F. Crossman.
Inventor.
John W. Roddy
By C. H. Belt
Attorney.

UNITED STATES PATENT OFFICE.

JOHN W. RODDY, OF WASHINGTON, DISTRICT OF COLUMBIA.

RESILIENT VEHICLE-WHEEL.

No. 814,479.

Specification of Letters Patent.

Patented March 6, 1906.

Application filed October 21, 1905. Serial No. 283,755.

*To all whom it may concern:*

Be it known that I, JOHN W. RODDY, a citizen of the United States, residing at Washington, in the District of Columbia, have invented certain new and useful Improvements in Resilient Vehicle-Wheels, of which the following is a specification.

This invention relates to vehicles-wheels, and pertains especially to the class of spring-wheels having radial spiral springs interposed between the wheel-hub and its tread.

The prime object of the invention is to provide means in a vehicle spring-wheel to permit the wheel to have a radial and circular movement between hub-flanges to which the wheel is movably clamped, such means permitting the revolution of the flanges with the wheel.

A further object of the invention is to provide in a resilient vehicle-wheel a connection between the wheel-web and the hub-flanges to permit the wheel to turn a limited distance between the flanges during the revolution of the latter and during the radial movement of the wheel relative to its axis.

A still further object of the invention is to provide in a resilient vehicle-wheel hub-flanges adapted to have the wheel-web clamped loosely therebetween, whereby the web may turn within the flanges according to the radial movement of the wheel during the revolution of the wheel and the flanges. In this class of wheels, where an abutment-float or a floating spring-controlled hub is employed, the floats permit a radial movement of the wheel during revolution, but do not afford a circular play of the wheel between the hub-flanges during revolution. For this reason such wheels have a radial jumping motion, injurious to them and to the occupants of a vehicle to which they are applied. It is therefore my purpose to overcome such defects and disadvantages as may be found in wheels having only a radial movement and to furnish a wheel having a circular sliding or swinging movement in addition to its radial movement during the revolution of the wheel.

With these and various other objects and improved results in view the invention consists is a wheel loosely hung between its hub-flanges, so as to be free to turn concentrically to its axis and the axis of the flanges during the revolution of the wheel and the flanges.

In the accompanying drawings, forming part of this application, Figure 1 is a side elevation of my improved wheel. Fig. 2 is a sectional view on the line $xx$, Fig. 1. Fig. 3 is a sectional view on the line $yy$, Fig. 2. Fig. 4 is an interior elevation showing sliding, concentric, and radial movement of the wheel parts. Fig. 5 is a perspective view of the flanges. Fig. 6 is a similar view of part of the web. Fig. 7 is a detail section showing a pair of spring-cups.

The same reference-numerals denote the same parts throughout the several views of the drawings.

The wheel-hub 1 may be of the ball-bearing type, or its axle-bearing may be of any of the well-known forms. The hub is provided with flanges 2, each having a circular rim 3, forming a central opening 4, and each rim has half-cups $1^a$. Each flange has a series of bolt-holes 5, provided with sleeves 6, through which suitable bolts 7 extend. The wheel-web 8 has a peripheral groove for a solid-rubber tire 9, a rim 10 on each side of the web forming a central opening 11, a series of cups $2^a$, a series of holes 12, in which the sleeves 6 meet, and said holes are of sufficient diameter greater than the size of the sleeves to permit the latter to work therein and the web to move independently of the hub and its flanges. A series of spiral springs 13 are placed in radial position between the rims 3 and the rims 10 and are held against lateral movement by the half-cups $1^a$ abutting, and the cups $2^a$. The web 8 extends centrally from the rims 10, and the flanges 2 project from the outer edge of the rim 3.

In assembling the parts the flanges are clamped together so that the rims 3 abut against each other within the opening 4 and centrally to the web 8, the half-cups are joined, the sleeves 6 meet in the web-holes 12, and the rims 10 are free to work between the flanges 2 and sustain the web and the springs centrally to the wheel-hub, or the sleeves may be only on one flange and long enough to reach across to the other flange.

It is obvious that the action of the wheel-web is independent of the hub and flanges both in radial and circular movement, that such independence permits the wheel-web to turn concentrically to the wheel-hub during the revolution of the wheel, and that such concentric movement is sufficient to place the weight carried by the wheel-axle in radial alinement with the tread-point of the wheel, thus avoiding the jumping sensation hereinbefore referred to and furnishing a wheel of uniform resiliency—that is, the wheel-hub is thrown in a direct radial line with the portion of the wheel-tread as the latter engages a road-surface during its revolution.

Having thus described my invention, what I claim as new, and desire to secure by Letters Patent, is—

1. In a resilient vehicle-wheel, the combination, with the hub-flanges having inwardly-projecting rims, of the wheel-web having side rims, a series of spiral springs interposed between the flange-rims and the web-rims, and means to loosely clamp the web between the flanges.

2. In a resilient vehicle-wheel, the combination, with a wheel-web having a central opening surrounded by a series of holes, of the hub-flanges covering said opening and holes, sleeves on each flange which meet in the holes, the spiral springs, and suitable bolts to clamp the flanges together with the web loose therebetween.

3. In a resilient vehicle-wheel, the combination, with a wheel-web having a series of holes and a circular rim on each side, of the flanges covering the holes and having lateral meeting rims connected to the wheel-hub, spiral springs interposed between the web-rims and the flange-rims, and suitable clamping-bolts extending through the holes to permit radial and concentric movement of the web between the flanges.

4. In a resilient vehicle-wheel, the combination with a wheel-web having a series of holes, a rim on each side of the web adjacent to the holes, and a series of cups projecting inwardly from the rims, of the wheel-flanges covering the holes and having rims connected to the wheel-hub and adapted to meet opposite said cups, half-cups joined at the meeting edges of the flange-rims and projecting outwardly opposite the web-cups, the springs held by the cups, sleeves on each flange which meet in said holes, and suitable bolts extending through the sleeves to clamp the flanges together and to permit radial and concentric movement of the web between said flanges.

In witness whereof I hereunto set my hand in the presence of two witnesses.

JOHN W. RODDY.

Witnesses:
LAWRENCE E. MONEY,
FRANK S. APPLEMAN.